United States Patent Office 2,973,299
Patented Feb. 28, 1961

2,973,299
TREATING INFECTIOUS SYNOVITIS WITH BRILLIANT GREEN

John M. Coffin, % State Board of Agriculture, Seaford, Del.

No Drawing. Filed July 22, 1957, Ser. No. 673,120

1 Claim. (Cl. 167—53.1)

The present invention relates to the treatment of infectious synovitis in poultry.

In recent years, infectious synovitis, also called arthritis complex or swollen joint disease, has become a major problem in the poultry industry. The problem is particularly prevalent in the broiler industry with poultry between eight and twelve weeks of age most susceptible. In its early stages, synovitis causes breast blisters and swollen spleens. The birds may turn pale and they tend to be less active than normal with a reduced feed consumption. As the disease progresses, the birds become less inclined to move, apparently due to increasing pain in the joints. Ultimately, the birds are unable to walk and loss of weight and dehydration take place with a resulting decrease in marketability. Bacteriological cultures of the vital organs of these birds are consistently negative. The exudate from the affected synovial membranes is likewise invariably bacteriologically sterile.

It will be appreciated from the foregoing that infectious synovitis is a costly and serious matter to poultry raisers. Certain of the new antibiotics, e.g., aureomycin, terramycin, streptomycin and furazoladone, have been suggested for the treatment of synovitis. Some of the antibiotics, e.g., tetracycline and furazoladone, have been somewhat successful in preventing the disease in birds which have not been affected. However, none of these antibiotics has had any effect on birds which are already infected with the disease.

The principal object of the present invention is to provide a composition and method for effectively preventing and for curing infectious synovitis in poultry. Another object of the invention is to provide means for treating poultry infected with infectious synovitis whereby the poultry may be permanently returned to a completely normal condition and function.

Other objects will also be apparent from the following detailed description of the invention.

According to the invention, infectious synovitis in poultry is avoided or eliminated by feeding the poultry small amounts of the dyestuff brilliant green. This may be accomplished by incorporating the brilliant green, either in the drinking water or the standard type of poultry feed.

Infectious synovitis is a generalized disease, typical lesions occurring in the vital organs, joints, tendon sheaths and bursae. The effectiveness of the brilliant green in treating poultry infected with synovitis or in preventing poultry from becoming infected therewith is unexplainable, particularly in view of the very small amounts of brilliant green which may be satisfactorily used and the fact that there seems to be little likelihood of any appreciable absorption in the blood stream.

The amount of brilliant green used for the purposes of the present invention can be varied over a fairly wide range. Drinking water comprising an aqueous solution containing as little as 0.002% by weight of the brilliant green represents approximately the minimum curative dosage while a concentration of .0004% brilliant green will effectively prevent the disease. The maximum desirable water dosage is about .02%. The minimum curative and preventive dosages when the brilliant green is admixed with feed is about double the water dosage, e.g., about .005% and .001%, respectively. Maximum feed dosage is about .05%.

The compositions of the invention may be prepared in any convenient fashion. Preferably, however, they are prepared by first making up a concentrated stock solution of brilliant green dissolved in a mixture of water and alcohol, e.g., ethyl alcohol or some other lower aliphatic alcohol, and then using this stock solution to modify the drinking water or feed in accordance with the purposes described herein. Typically, a stock solution comprising 92 grams of brilliant green dissolved in one quart of 70% ethyl alcohol and sufficient water to make one gallon may be used. This represents about .02 part of brilliant green per part of solvent. The resulting stock solution may then be added to the drinking water, feed or other vehicle in the amount necessary to give the particular concentration which might be desired.

One desirable way of incorporating the brilliant green in the feed, comprises spraying the feed with the stock solution and, either simultaneously or subsequently, thoroughly agitating the feed to obtain a uniform admixture. The composition of the stock solution, whether used for modifying feed or for addition to water, may be widely varied. If desired, the water may be omitted therefrom and the brilliant green dissolved exclusively in alcohol or some other non-toxic solvent. Small amounts of iodine, e.g., .005 to .05% by weight, or other materials, may also be included in the drinking water or feed, according to the invention, to supplement the effect of the brilliant green.

It will be appreciated that the duration of the treatment of poultry with brilliant green in accordance with the present invention will vary depending upon the severity of the disease, dosage and other factors. Usually, however, it has been found that treatment of infected birds for a period of from three to four days is effective. Recurrence of the disease after such treatment is unlikely but further periodic medication with brilliant green, e.g., 1 or 2 days each week, will insure against recurrence.

The invention is further illustrated by the following examples:

*Example 1*

A flock of 3400 seven-week-old Vantress Whites of which about 8–15% were showing mild to severe synovitis symptoms, was selected for treatment according to the invention described herein. An autopsy on down birds showed synovitis lesions, pus in hock joints, enlarged liver and spleen, abscessed keel bursae, all of which are characteristic of synovitis. It also appeared that the birds were suffering from catarrhal enteritis.

The synovitis and enteritis symptoms had existed for between seven to ten days when treatment of the flock with brilliant green was begun. Initially, the treatment involved the addition of about .002% by weight of brilliant green to the drinking water. This was continued for about three days with a definite and noticeable improvement in the condition of the birds. Most of the flock was now on its feet and the birds appeared considerably more lively. The dosage of brilliant green was increased to about .006% for a day and then decreased to about .002% for three more days. Practically no signs of synovitis remained at the end of this time.

It was apparent from the results obtained by the treatment described in the above example that the brilliant green protected healthy birds against synovitis as well as restoring infected birds to their normal function. Infected down birds were standing within several days. Normal eating was resumed and the birds gained weight throughout the treatment.

The brilliant green used in the foregoing example was added to the drinking water in the form of a relatively concentrated stock solution comprising 92 grams brilliant green dissolved in one quart 70% ethyl alcohol and sufficient water to make one gallon.

*Example II*

The stock solution used in Example I was sprayed on about 100 pounds of standard poultry feed known as "Shore Broiler Mash." Additional feed was added and the resulting mass mixed thoroughly to give a feed containing about .005% by weight of brilliant green. This feed was fed to poultry infected with synovitis with effective elimination of the synovitis symptoms in a period of three days.

The above-mentioned poultry feed "Shore Broiler Mash" has the following composition:

|  | Lbs. |
|---|---|
| Ground corn | 1220 |
| Soybean oil meal (44%) | 450 |
| Corn gluten meal | 50 |
| Meat scraps | 130 |
| Fish meal | 20 |
| Vitamin trace mineral supplement | 75 |
| Alfalfa meal | 25 |
| Defl. phosphate | 20 |
| Salt | 10 |
|  | 2000 |

In lieu of this particular feed, any other conventional feed stuff may be used for the purposes of the present invention.

*Example III*

A flock of ten-week-old broilers suffering from a relatively severe outbreak of infectious synovitis were treated by adding brilliant green to their drinking water to a concentration of about .005% by weight. In three days, the birds had recovered completely. After twelve days, there was no recurrence of the infection and none of the birds showed any synovitis symptoms.

As will be apparent from the foregoing, the use of brilliant green in the manner described herein is highly advantageous for the treatment of enteritis in poultry as well as synovitis. It will also be appreciated that various modifications may be made in the invention described herein without deviating from the scope thereof as set forth in the appended claim wherein—

I claim:

A process for treating infectious synovitis in poultry which comprises feeding the same a composition containing from .002% to .02% by weight of brilliant green as the sole active ingredient.

References Cited in the file of this patent

Harwood: J.A.V.M.A., vol. 97, September 1940, p. 248.

Hutyra: Pathology and Therap. of the Diseases of Domestic Animals, vol. III, 1938, Alexander Eger, Chicago, Ill., p. 759.

U.S. Disp., 25th ed., 1955, p. 1951.

Hutyra et al.: Pathology and Therap. of the Diseases of Domestic Animals, vol. III, 1938, pp. 484 and 485.